United States Patent
Gates

(10) Patent No.: US 8,341,159 B2
(45) Date of Patent: Dec. 25, 2012

(54) CREATING TAXONOMIES AND TRAINING DATA FOR DOCUMENT CATEGORIZATION

(75) Inventor: Stephen C. Gates, Redding, CT (US)

(73) Assignee: International Business Machines Corporation, Armonk, NY (US)

( * ) Notice: Subject to any disclaimer, the term of this patent is extended or adjusted under 35 U.S.C. 154(b) by 764 days.

(21) Appl. No.: 11/734,528

(22) Filed: Apr. 12, 2007

(65) Prior Publication Data
US 2007/0185901 A1    Aug. 9, 2007

Related U.S. Application Data

(62) Division of application No. 10/205,666, filed on Jul. 25, 2002, now Pat. No. 7,409,404.

(51) Int. Cl.
*G06F 7/00* (2006.01)
*G06F 17/30* (2006.01)

(52) U.S. Cl. .......... 707/738; 707/739; 707/740

(58) Field of Classification Search .......... 707/705, 707/736, 737, 738, 739, 1, 2, 7, 100, 740
See application file for complete search history.

(56) References Cited

U.S. PATENT DOCUMENTS

| | | | | |
|---|---|---|---|---|
| 5,778,363 A | * | 7/1998 | Light | 707/5 |
| 5,832,182 A | * | 11/1998 | Zhang et al. | 706/50 |
| 5,848,410 A | * | 12/1998 | Walls et al. | 707/4 |
| 5,899,992 A | * | 5/1999 | Iyer et al. | 707/7 |
| 6,360,227 B1 | * | 3/2002 | Aggarwal et al. | 707/102 |
| 6,385,602 B1 | * | 5/2002 | Tso et al. | 707/3 |
| 6,621,930 B1 | * | 9/2003 | Smadja | 382/224 |
| 6,868,411 B2 | * | 3/2005 | Shanahan | 706/52 |
| 6,920,448 B2 | * | 7/2005 | Kincaid et al. | 707/3 |
| 6,920,450 B2 | * | 7/2005 | Aono et al. | 707/3 |
| 7,089,238 B1 | * | 8/2006 | Davis et al. | 707/5 |
| 7,152,063 B2 | * | 12/2006 | Hoashi et al. | 707/5 |
| 7,308,451 B1 | * | 12/2007 | Lamping et al. | 707/100 |
| 2002/0147694 A1 | * | 10/2002 | Dempsey et al. | 706/12 |

* cited by examiner

*Primary Examiner* — Marc Somers
(74) *Attorney, Agent, or Firm* — Michael J. Buchenhorner; Vazken Alexanian

(57) ABSTRACT

Methods, apparatus and systems are provided to generate from a set of training documents a set of training data and a set of features for a taxonomy of categories. In this generated taxonomy the degree of feature overlap among categories is minimized in order to optimize use with a machine-based categorizer. However, the categories still make sense to a human because a human makes the decisions regarding category definitions. In an example embodiment, for each category, a plurality of training documents selected using Web search engines is generated, the documents winnowed to produce a more refined set of training documents, and a set of features highly differentiating for that category within a set of categories (a supercategory) extracted. This set of training documents or differentiating features is used as input to a categorizer, which determines for a plurality of test documents the plurality of categories to which they best belong.

21 Claims, 10 Drawing Sheets

CREATING TAXONOMIES AND TRAINING DATA FOR DOCUMENT CATEGORIZATION

CROSS-REFERENCE TO RELATED APPLICATIONS

This application is a division of, and claims priority from, U.S. patent application Ser. No. 10/205,666, filed on Jul. 25, 2002 now U.S. Pat. No. 7,409,404.

FIELD OF THE INVENTION

The present invention relates generally to the creation of taxonomies of objects, particularly objects that can be represented as text, and to categorizing such objects.

BACKGROUND OF THE INVENTION

In a previous invention, U.S. Pat. No. 6,360,227, we described a generalized method for automated construction of taxonomies and for automated categorization, or content-based recommendations. A system based on that invention might be used, for example, to construct a taxonomy, or organized set of categories, into which all of the documents on the Web might be categorized without human intervention, or to filter out objectionable categories of data on children's computers. U.S. Pat. No. 6,360,227, issued Mar. 19, 2002, is incorporated herein by reference in entirety for all purposes.

It would be advantageous to have general, semi-automated methods for creating training data for such systems and further refinements in the creation of taxonomies. These new methods make it possible to create taxonomies of very large size that can be used to categorize even highly heterogeneous document collections (such as the World Wide Web) with near-human accuracy.

SUMMARY OF THE INVENTION

An aspect of the present invention is to provide methods, apparatus and systems for constructing a taxonomy in a way that makes sense to both humans and a machine categorizer, and then selecting training data to enable a categorizer to distinguish with high accuracy among very large numbers (e.g., 8,000 or even very much more) of categories in such a taxonomy. A central feature of advantageous methods is the selection of categories that are minimally-overlapping.

In a particular aspect the present invention provides a method for generating from a plurality of training documents one or more sets of features representing one or more categories. The method includes the steps of: forming a first list of items such that each item in the first list represents a particular training document having an association with one or more elements related to a particular category; developing a second list from the first list by deleting one or more candidate documents which satisfy at least one deletion criterion; and extracting the one or more sets of features from the second list using one or more feature selection criteria.

It is advantageous for the method to include in the step of forming a first list the steps of: creating one or more formed queries, wherein each formed query is in regard to a simple category; submitting each of the at least one formed query to at least one search engine providing a set of results; retrieving a set of URLs from the set of results to the step of submitting; and composing the first list of items, such that each item also represents a particular training document pointed to by one URL from the set of results. Other aspects and embodiments will become clear from the description of the invention herein.

BRIEF DESCRIPTION OF THE DRAWINGS

The invention is best understood from the following detailed description when read in connection with the accompanying drawings, in which.

DESCRIPTION OF THE INVENTION

Figure 1:
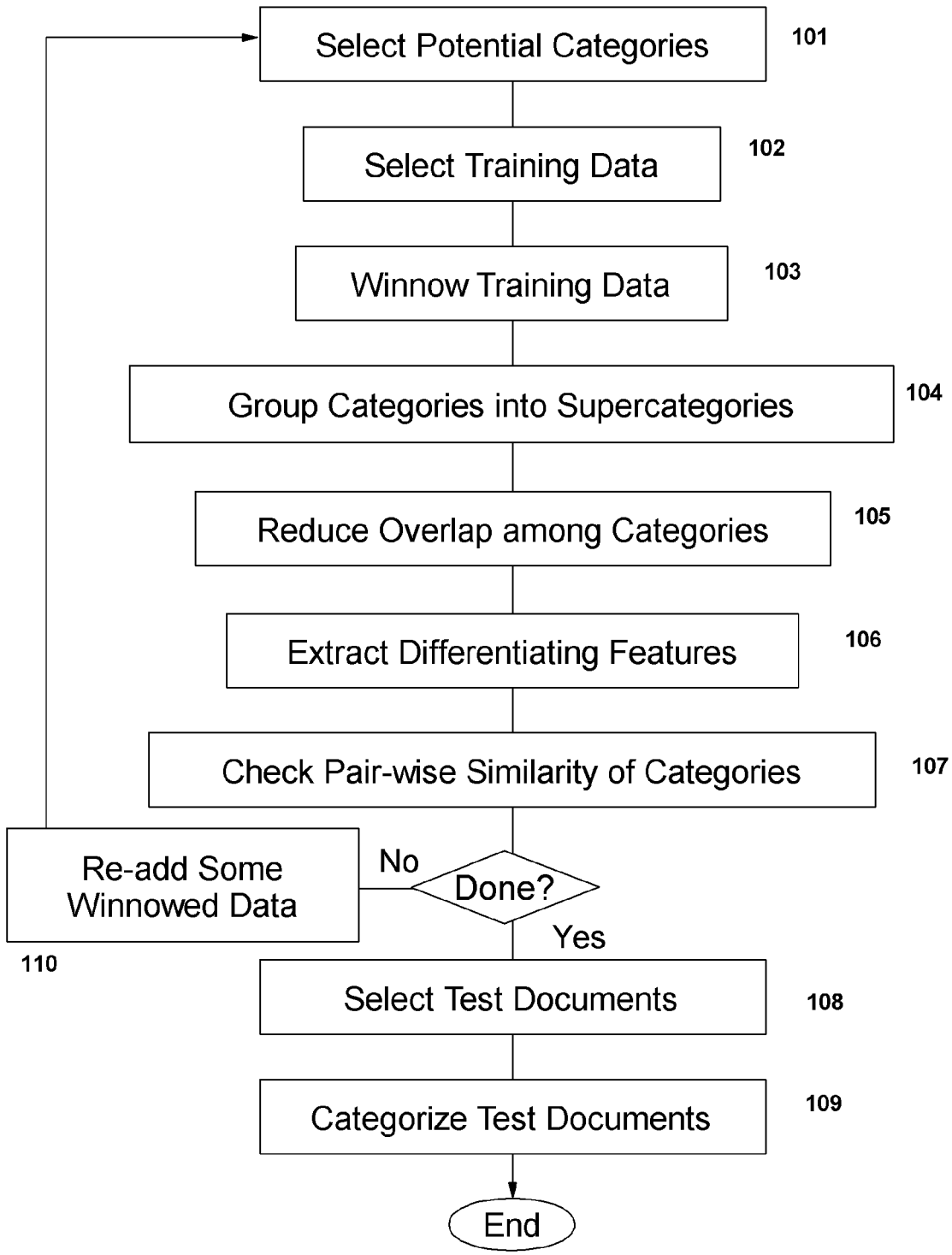
FIG. 1 illustrates an example of an overall process in accordance with the present invention.

In this invention, we provide general, semi-automated methods for creating training data for categorization systems and further refinements in the creation of taxonomies. These new methods make it possible to create taxonomies of very large size that can be used to categorize even highly heterogeneous document collections (such as the World Wide Web) with near-human accuracy.

Training data are the data used in automated categorization systems to teach the systems how to distinguish one category of document, from another. For example, one might train a categorizer to distinguish between documents about men's health and women's health by collecting a set of documents about each subject, and then applying some sort of feature extraction process, which would try to determine the essence of what makes documents about men's health different from women's health. The features used by most feature extraction processes are words, or less commonly groups of characters or word phrases. Generally, many features are extracted; in our example, a feature extraction process might extract words like men, prostrate, and male for men's health, and women, ovarian, gynecological, and female for women's health. Generally, the goal is to extract a large number of such features, in part because a specific document to be classified, herein referred to as a test document, may include only a few of the features that were discovered during the feature extraction process.

The process of feature extraction becomes more complex as such systems try to distinguish among larger and larger numbers of categories, and as the training documents become more heterogeneous. This occurs for several reasons. First, as we increase the number of categories being considered, we usually find it more difficult to find features that differentiate one category from another sufficiently. In the above example, if we try to distinguish, say, men's and women's literature, as well as men's and women's health, all of the features (words) we mentioned for men's health may also occur in men's literature. Also, many training documents include information about more than one subject.

More subtle issues also arise in almost all categorization systems. For example, the selection of the categories amongst which we wish to distinguish may substantially impact the results. Most existing categorization systems start with a human-selected set of categories; these may or may not be sensible to a machine-based categorizer. For example, a human may choose categories such as "American Civil War battles" and "American Revolutionary War battles." However, because battles in these two wars often occurred at the same locations and with similar weaponry, a word-based categorization system may have great difficulty distinguishing between these topics if it does not possess, for example, the knowledge that a short battle description including the date 1776 is unlikely to be about the American Civil War.

The selection process for the training documents is equally important. For example, issues that might be described as ones of sampling bias arise in which the ways in which we pick the particular training documents from heterogeneous document collections can bias the resulting set of selected features. If, for example, we pick all or most of the training documents for a particular category from one author, then the words selected as features may reflect the vocabulary of that particular author rather than some set of features we would find in all documents on that same subject. We usually generalize this requirement to become a criterion that training documents must be sufficiently dissimilar to one another. That is, we ensure that we have as broad and representative a sample of the subject as possible by removing documents that are too similar to other training documents; often "too similar" is defined as closer than some preset distance from one another (see below for a description of distance measures).

Furthermore, many potential training documents suffer subject contamination; that is, they include more than one subject, and we carefully treat such documents to avoid picking up features that actually belong to another subject than the one of interest. When trying to automate the process of collecting training documents, we therefore advantageously add another criterion; namely, that the training documents be sufficiently similar to one another (within a certain distance of one another). Documents including multiple topics, and documents too far off topic, are excluded by this criterion.

Once the training data have been selected and the features extracted from them, a categorizer, or system for assigning categories to documents, is usually invoked. Such a categorizer uses the features extracted from the training data for each category to determine, in some manner, the category or categories to which one or more test documents should be assigned. Categorizers range widely in terms of their sophistication. However, the goal of almost all such systems is to be as accurate as possible; usually this accuracy is measured relative to some human-derived testing standard, such as comparison to categorization of a standard set of documents into a known taxonomy by a group of humans.

Interestingly, the availability of testing standards has tended to focus efforts on building better and better categorizers; i.e., ones able to better distinguish documents known to belong to a particular category within a human-derived taxonomy. The current invention, however, has found that a much more useful exercise is to focus on the construction of the taxonomy in such a way that both a human and a machine categorizer can most effectively use it.

In practice, the needs of humans and machine categorizers can be hard to reconcile. On the one hand, a taxonomy should make sense to the human. As used herein, a taxonomy is said to make sense and/or be sensible to a human if the categories conform to a rather vague set of cultural norms about how information should be organized and of what is important (e.g., a taxonomy of computers based on the size of their on-off switches would not normally be considered sensible, but one based on the computing power of the central processor would be). Examples of the cultural norms about taxonomies might include:

1) A taxonomy of categories is organized in a hierarchical fashion, from the most general to the most specific, with each more specific topic being a subcategory (subdivision) of the preceding more general topic.
2) The labels on the taxonomy describe the topics or concepts accurately and completely.
3) Nearness of two nodes on a taxonomy indicates that the topics are conceptually related.
4) Categories are generally of the same scope for nodes at the same level (e.g., nodes labeled "history" and "preschool educational software" would not normally be at the same level, i.e., the same distance from the starting point of the hierarchy).
5) The taxonomy is complete within its scope; for example, a taxonomy of medical diseases would include all diseases, and would not omit major diseases such as cancer.

On the other hand, in order for machine categorization to be accurate, the requirement is more specific, namely that there be a way to accurately describe the boundaries of each category. It is thus entirely possible to have a category that, for example, has well-defined boundaries but is nonetheless not very sensible (such as the example using size of on-off switches). Much of this invention describes how to reconcile these two sets of needs.

Much of the current implementation of this invention utilizes data obtained on the World Wide Web. Each document on the Web typically is stored on one or more computers; for each such document, there is a Uniform Resource Locator, or URL, which can be translated into an exact location at which the document may be reproducibly located and retrieved. Web search engines are designed to help users find documents by giving them the URL (and perhaps other information such as title and abstract) of documents or other objects located on the Web. Users typically use the search engines by submitting a query, or specialized set of words describing the items they wish to find. For example, a set of documents on personal computer manufacturers might be retrieved by submitting a query such as +"computer companies"+"personal computer" −software. For many such engines, words or phrases in the query that are required to be present might be preceded by a plus sign, and words or phrases required to be absent are preceded by a minus sign. Search engines then return a list of information; this information virtually always includes at a minimum a list of hypertext links, or URLs listed in a special way which enables a browser, or Web page viewer, to retrieve the linked-to page whenever a user performs the action of clicking their mouse (pointer) on the text associated with the link.

Another typical operation in most categorization systems involves converting a document from a piece of text to a numerical representation. This enables the system to easily and efficiently compare and describe documents. A commonly-used system to describe documents mathematically uses the frequency of features in a document. In this method, a dictionary of interest is constructed. Each item in the dictionary is described with an identifier (a unique number). Multiple items in the dictionary may be assigned the same identifier if they represent the same general concept; commonly, for example, words are stemmed, meaning that endings are removed. Words that are the same after stemming are assumed to be the same. Thus, for example, the words play, played, and playing all are forms of the word play, and thus are stemmed to play, and assigned the same numerical identifier. A document is then converted to numbers by counting the frequency of occurrence of each word from the dictionary in the document, and creating a mathematical description, or vector, which gives the numerical identifier and frequency of each feature in that document.

A collection of training documents from a given category is also often described numerically. One such representation is a centroid, which might roughly be thought of as the mathematical description of the "typical" document from this category; in two dimensions, the analogous representation would be the center of a circle. Such a centroid is computed as the average of the vectors describing the collection of training documents from that category. Often, a pseudo-centroid is used instead of a centroid; a pseudo-centroid is similar to a centroid, but instead of having an exact sum of the vectors, a pseudo-centroid adds some variant of the vectors, such as one in which the square roots or logarithms of the frequencies are used instead of the frequencies. Pseudo-centroids are used rather than centroids because they are less sensitive to the presence of highly unusual training documents.

In systems involving categorization, it is often important to measure the similarity of two documents, or of a document to a centroid or pseudo-centroid. One of the most common, and most simple, techniques for doing this is the cosine measure. In effect, the cosine measure is a simple angular measure analogous to the familiar cosine of plane geometry, except applied to multidimensional space (where the dictionary words are the dimensions and distances are related to word frequencies). The cosine measure varies from 1.0 when two vectors are completely identical to 0.0 when the two vectors are completely different. Details on the calculation of pseudo-centroids and cosines are in U.S. Pat. No. 6,360,227.

One other useful concept in this discussion is that of super-category. In considering large numbers of categories (perhaps thousands or even tens of thousands of categories), it is often convenient to group categories together into collections we have called supercategories; such groupings may also reduce computational complexity and improve computational speeds in forming categories and in categorizing documents. These supercategories may be groupings based on "is-a" relationships (e.g., "canoeing is a water sport") or groupings by similar vocabulary (e.g., all categories mentioning the word "religion") or even just things like "every set of 100 items in this alphabetical list is a supercategory." Typically, however, supercategories include categories with some property or set of properties in common.

A final, key concept in this invention is "overlap." Much of this invention describes ways of keeping categories from overlapping, or at least of minimizing overlap. Several examples of overlap may help. For example, two categories may overlap if one is a subcategory of the other (e.g., cookie is a subcategory of dessert). A more subtle form of overlap can occur when categories are not mutually exclusive (we often describe this by saying that they were not "sliced and diced" in the same way). Thus, for example, we might divide a category called databases into subcategories called parallel and single-system, or into subcategories called object-oriented and relational, but not into all 4 subcategories, because a database can be both parallel and relational; i.e., the 4 subcategories are not mutually exclusive and thus are said to overlap. In a more rigorous sense, categories are said to overlap to the extent to which they share common features. Overlap can often be reduced by judicious selection of highly differentiating features, i.e., by using only features which best distinguish one category from another. Thus, for example, within a supercategory on databases, a category on object-oriented databases and a category on relational databases may overlap on the word "database" but can perhaps be differentiated because one mentions "object-oriented" frequently and "relational" infrequently or not at all, and the other mentions "relational" frequently and "object-oriented" infrequently or not at all.

FIG. 1 shows a flow diagram of an embodiment of an example of a taxonomy construction and training data selection process described in this invention. Subsequent figures show details of many of its steps. It begins with step 101, the selection of a set or sets of potential categories for the categorization system. This selection is by any of a variety of means. One such means is to choose a subject area, and then successively divide it into logical subcategories. Another such means is to collect a large number of possible category names from a variety of sources. The categories can be, although do not need to be, arranged in any particular order or hierarchy. In general, this step works best if the categories selected are as non-overlapping as possible; i.e., if they are either conceptually as independent of one another as possible, or if they include as few features in common as possible. However, a useful criterion is that the categories be human-selected, so that they ultimately make sense to human users (in contrast to machine-selected categories, which often do not make sense to human users).

In step 102, training data is selected for each of the categories selected in step 101. Often, this is a list of training documents known or purported to be representative of each of the selected categories. Generally, for reasons of statistical sampling, the number of training documents is large, with a mix of documents from a number of different sources.

In step 103, the training data for each category from step 102 are winnowed down to a smaller set of training data, by applying some set of criteria. We have found that the most effective criteria are related to ensuring that each training document is purely on one topic, namely that of the category of interest.

In step 104, the training data obtained in step 103 from several related categories are grouped into a supercategory using some supercategory formation criterion. It should be noted that if the categories are all closely related already, this step may not be necessary; however, for large heterogeneous systems of categories it is necessary to enable us both to reduce the computational requirements for solving the problem and to best pick out highly differentiating features (step 106 below).

In step 105, the grouped training data from step 104 are compared and overlap among categories within a supercategory reduced or eliminated.

In step 106, a set of differentiating features is extracted from the training data produced in step 105.

In step 107, pairs of categories with the highest similarity are examined to determine how to reduce the degree of overlap. The goal of this step and the preceding steps is to produce a set of features with a minimum degree of overlap between and among categories and supercategories.

Often, the output of steps 101-107 is used with an automated categorizer to categorize a set of documents. Thus, optionally, in step 108, a set of test documents is selected. This may be by any of a plurality of means; the goal is simply to pick documents that need to be categorized for some particular purpose. In step 109, the test documents are categorized using the features extracted in step 106.

Optionally, in step 110, we may, after step 107 or some other point in the process, use a re-addition criterion to add back into our set of training documents some of the documents eliminated in step 103 in order to increase the number of training documents. The most common source of documents to reinsert in our system is the documents omitted in step 103 because their title did not match the required words in the query and the decision whether to re-add the document is based upon it being sufficiently similar to the documents obtained after step 107. In practice, as described below, some of these steps occur iteratively and some of the steps may occur simultaneously.

Figure 2:
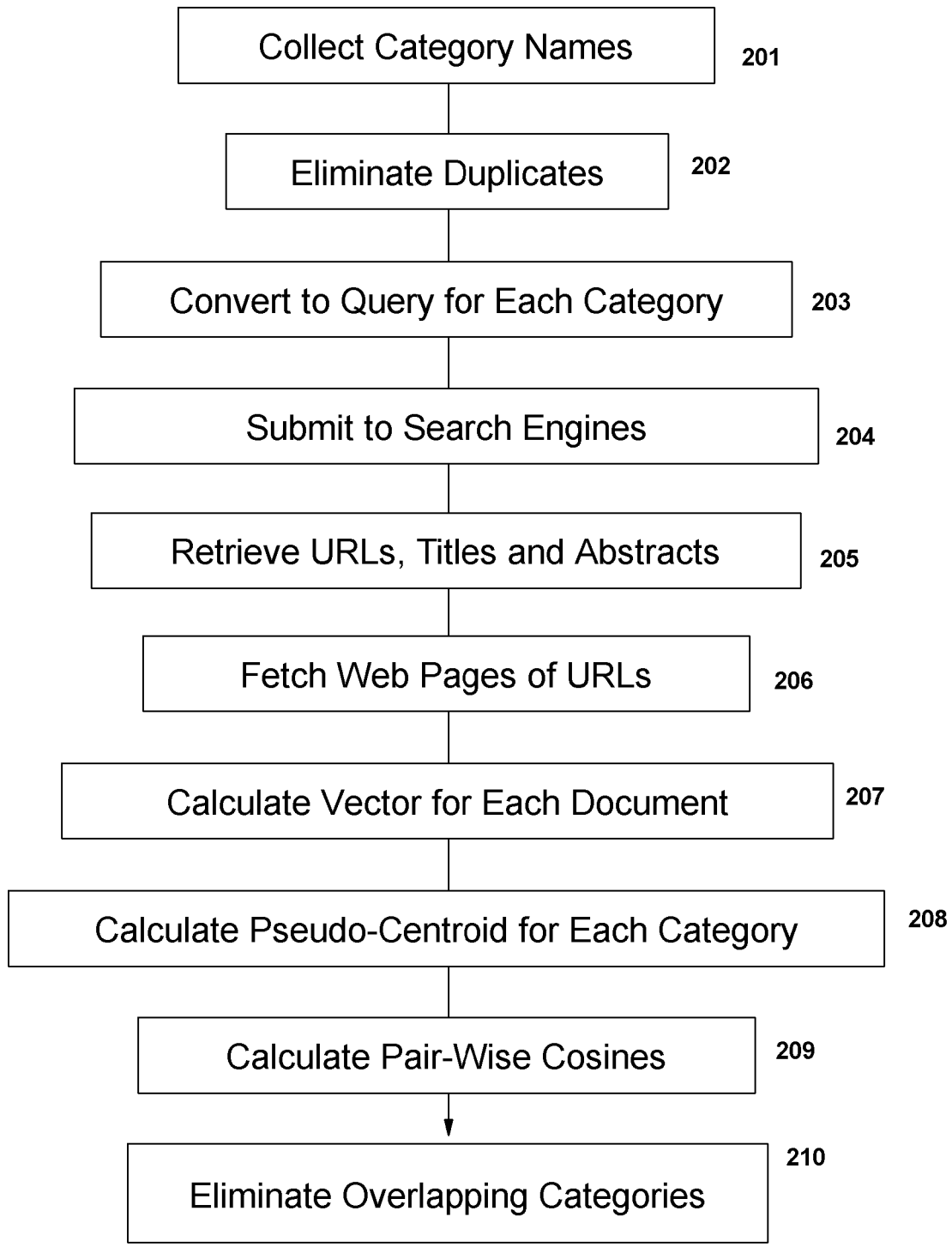
FIG. 2 illustrates an example of a method for selecting categories from a list of candidate categories.

We routinely implement at least three versions of step 101. The first method is simply to manually form a set of categories of interest. The second method of implementing step 101 is shown in FIG. 2. In step 201, a large set of potential category names is collected from a variety of sources. Because the names are from multiple sources, it is desirable to eliminate duplicate names, step 202; this reduces the number of names substantially. Then in step 203, the reduced set of category names from step 202 is converted into a query, usually with at least one required word or phrase; this query is then submitted to a plurality of Web search engines in step 204. The search engines return a plurality of URLs, titles and abstracts for each category in step 205. The full text of each document described by the search engines is retrieved in step 206. The vector for each document is calculated in step 207, and from these a pseudo-centroid is calculated for each category in step 208. The cosine between every pair of pseudo-centroids is calculated in step 209; pairs of categories with high cosines (high similarity) are then manually examined in step 210 and some of the categories where high overlap exists are manually discarded or modified to produce a refined list of categories with low to moderate overlap. In some cases, it is possible to omit steps 206 and 207; the pseudo-centroid is then just the vector describing all of the titles and abstracts for a given category. In another variant, we create compound queries (generally the Boolean OR of two or more queries) rather than the simple queries of step 202, in order to provide a more flexible representation of the topic; e.g., "bathroom sinks" might be represented as a query +"bathroom sinks" OR +"bathroom sink." The components of the query are usually submitted separately and the results from the various components combined into a single set of training documents.

Figure 3:
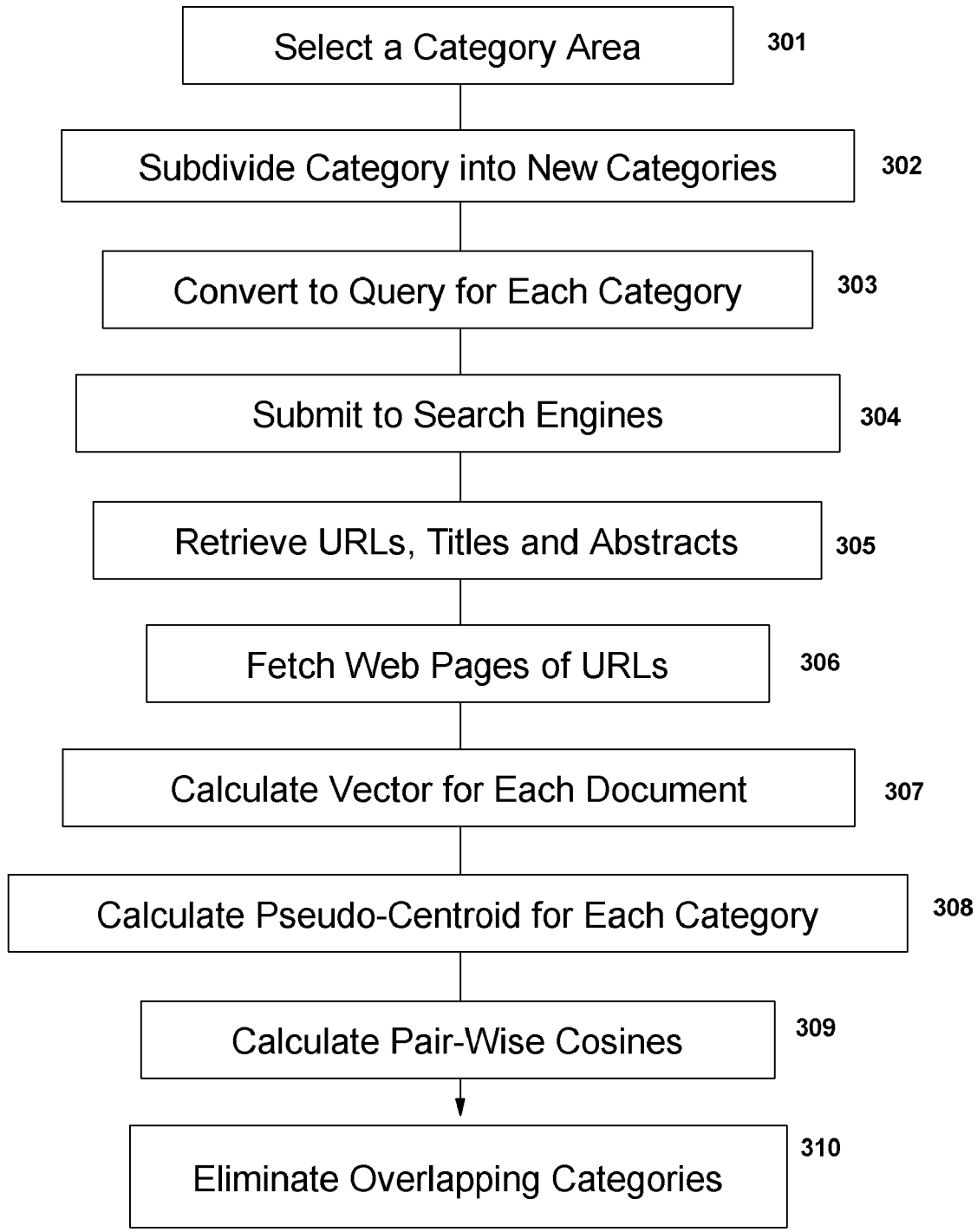
FIG. 3 illustrates an example of a method for building categories from more general categories.

FIG. 3 shows an alternative implementation of step 101. In practice, the method of FIG. 2 is rapid, but often results in a set of categories that are less than optimally independent of one another. Hence, we supplement the method of FIG. 2 with a more manual method, as follows: In step 301, we select a starting general category area. In step 302, we divide that category into subcategories using some criterion that is consistent across all subcategories. We may repeat step 302 several times to produce ever finer subcategories. The best results are obtained with this method when the criterion for dividing is absolutely consistent; this tends to produce categories that logically, at least, do not overlap. Steps 303 through 310 are then essentially identical to steps 203 through 210, respectively.

Figure 4:
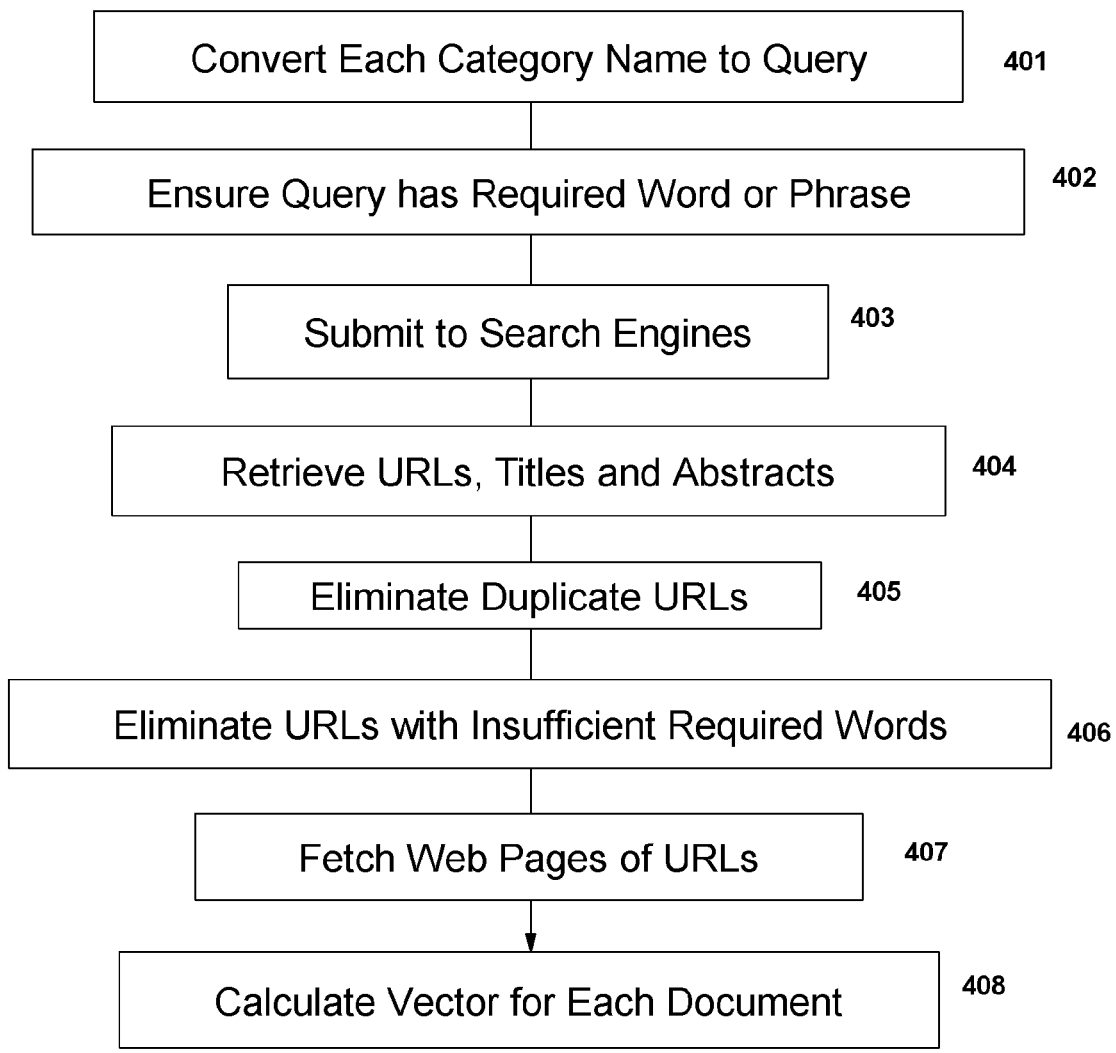
FIG. 4 illustrates an example of selection of training data for each category.

FIG. 4 shows the details of an example implementation of step 102, namely, the selection of training data for each category. In principle, the selection can be from any existing list of training documents known to be about the category of interest. However, such lists are often not available and should be constructed, advantageously in an automated fashion. Hence, we start with the output of step 101, which is a list of categories. Generally, we use only the leaf nodes, or most detailed categories in the taxonomy. In step 401, we form each name into a search-engine query by ensuring that it meets the syntax rules required by the search engines we utilize. We now, in step 402, determine if each query includes a required word or phrase. If the query does not, we make at least one word or phrase required. In step 403, we submit the query to one or more commercial search engines and, in step 404, obtain a new set of results including URLs, titles and abstracts. We also, in step 405, eliminate all duplicate URLs; i.e., ones that point at the same document. We then eliminate all URLs which do not include some set of key words in some portion of the document, step 406. For example, we may eliminate documents not including the required words in the title of the document. We may also require other words from the query in the body of the text or the abstract. This has the highly desirable effect of eliminating most of the documents that are not entirely on the topic of interest. For example, if the query is +"artificial intelligence" then a document which only mentions artificial intelligence in a document about "Review of advances in computer science" is probably less likely to be about AI than a document where the title is "Review of recent research in artificial intelligence." In step 407, the documents pointed to by the URLs remaining after step 406 are retrieved to create a first list of training documents. For each document in this list we maintain its URL and a set of document elements including title, abstract, and the document text. For each such document, a vector is calculated, step 408, which includes the words and word counts for all the stemmed words in the document that also appear in our dictionary. All of the lists, documents and vectors are generally stored for subsequent use or reuse; often, the documents are concatenated together with descriptive headings by category to make them easier to access.

Figure 5:
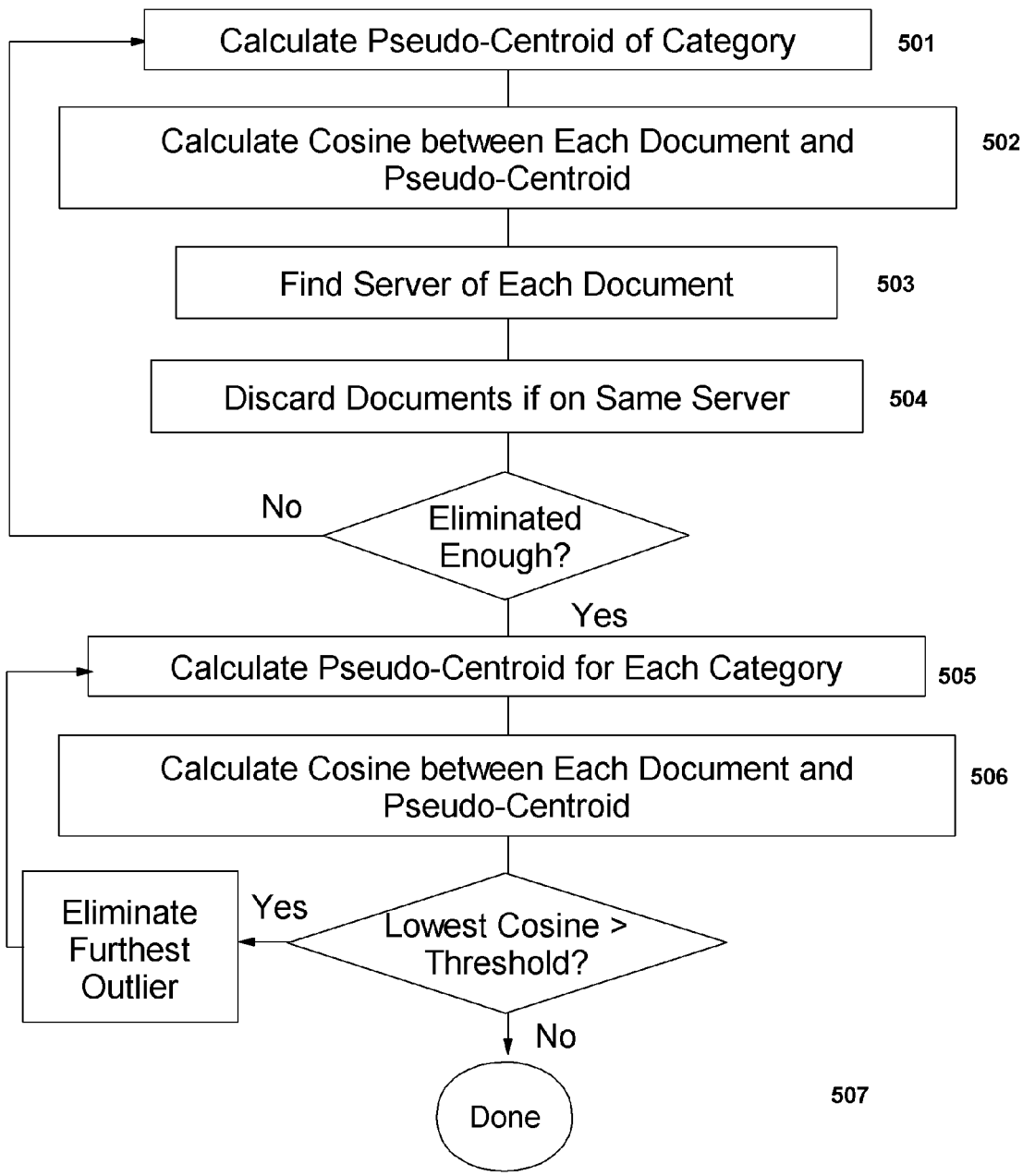
FIG. 5 illustrates an example of the winnowing of the training data.

In FIG. 5, we show how step 103 (winnowing the training data) is implemented in practice using one or more deletion criteria. The first deletion criterion is generally the elimination of outliers; i.e., documents too dissimilar to other training documents. The underlying principle here is that if a set of training documents is carefully selected in the first place, then it is highly likely that the documents closest to the centroid of this set of documents is actually about the topic of interest. By discarding outliers, we leave just documents close to the centroid. In step 501, we begin using the output of step 102 to produce a newly refined (second) list of documents by first using the vectors from all of the training documents in the category to calculate a pseudo-centroid. Next, in step 502, we calculate the cosine between each of the documents in the category and the pseudo-centroid. We then implement a second deletion criterion by finding documents that are highly similar to one another, in particular by inspecting the URLs of all documents in the set, in step 503, to find which are on the same physical computer (server) as one another. All but some small number, typically 2, of those on the same server are discarded in step 504; we do this by discarding from amongst those on the same server the document with the lowest cosine (i.e., at the furthest distance) to the pseudo-centroid. This improves statistical sampling for the training set by avoiding over-weighting the sample with too many documents from the same server. If too many documents on the same server still remain, steps 501-504 are repeated as necessary.

As an alternative to steps 503 to 504, we may also delete one of any pair of documents that have more than some preset number or fraction of their features in common. In any case, once this is complete, we continue eliminating outliers, by iteratively recalculating the pseudo-centroid of the remaining documents (step 505), calculating the distance of all of the documents from that pseudo-centroid (step 506), determining if the document furthest from the pseudo-centroid (i.e., the one with the lowest cosine) is at a greater distance (having a lower cosine) than a preset threshold (anywhere between zero and unity, inclusive) from the pseudo-centroid and, and if it is, discarding that document from further consideration (step 507). If the distance is less than or equal the threshold, we stop the iterations. In our system, the threshold, which can range from 0 to 1, is typically 0.25. An alternative to steps 505 to 507 is to eliminate those documents that have the fewest number of features in common with any of the other training documents, based on pair-wise comparisons of documents. Other document elimination criteria may include: eliminating training documents that do not include at least one or more preselected words or phrases; finding that two training documents have the same title and abstract and eliminating one of the two training documents; finding that two training documents being tested have a small distance measure between them and eliminating one of them; and combinations of these criteria. If we use supercategories, these criteria may be applied to only documents within the same supercategory.

Steps 101 to 103 are then generally repeated with a large number of categories, creating a list of training documents for each category; we often try to obtain a list having at least 50 to several hundred training documents for each category at this point in the process in order to have a sufficiently representative sample of the category. At this point, we may skip to step 105. However, for large numbers of categories, and when higher-speed categorization is required, useful and/or desired, we have found it advantageous to first group similar categories together into supercategories. We subsequently describe several different supercategory formation criteria to define which categories are similar to one another.

Figure 6:
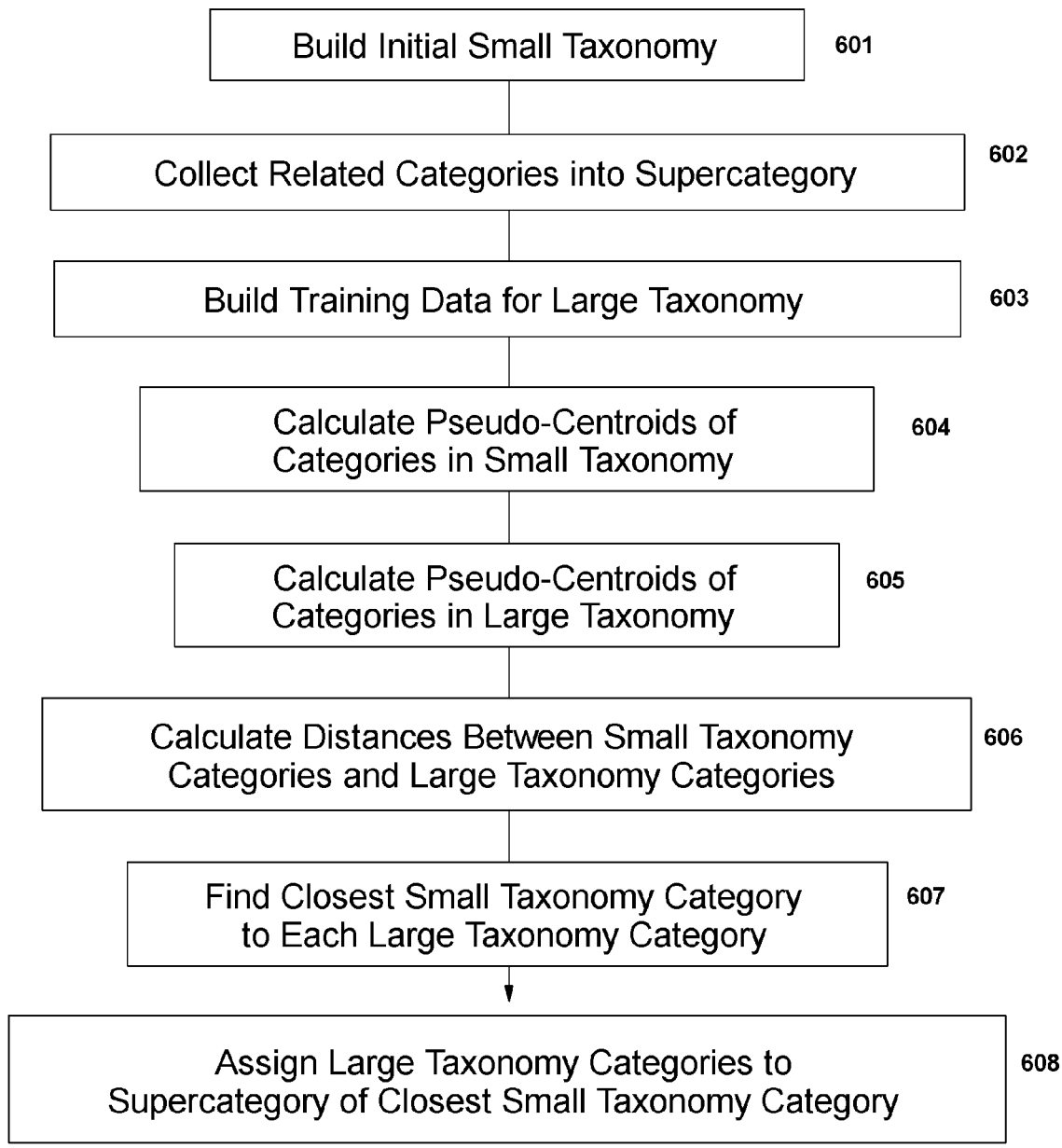
FIG. 6 illustrates an example of a method of using a set of general categories to form supercategories.
Figure 7:
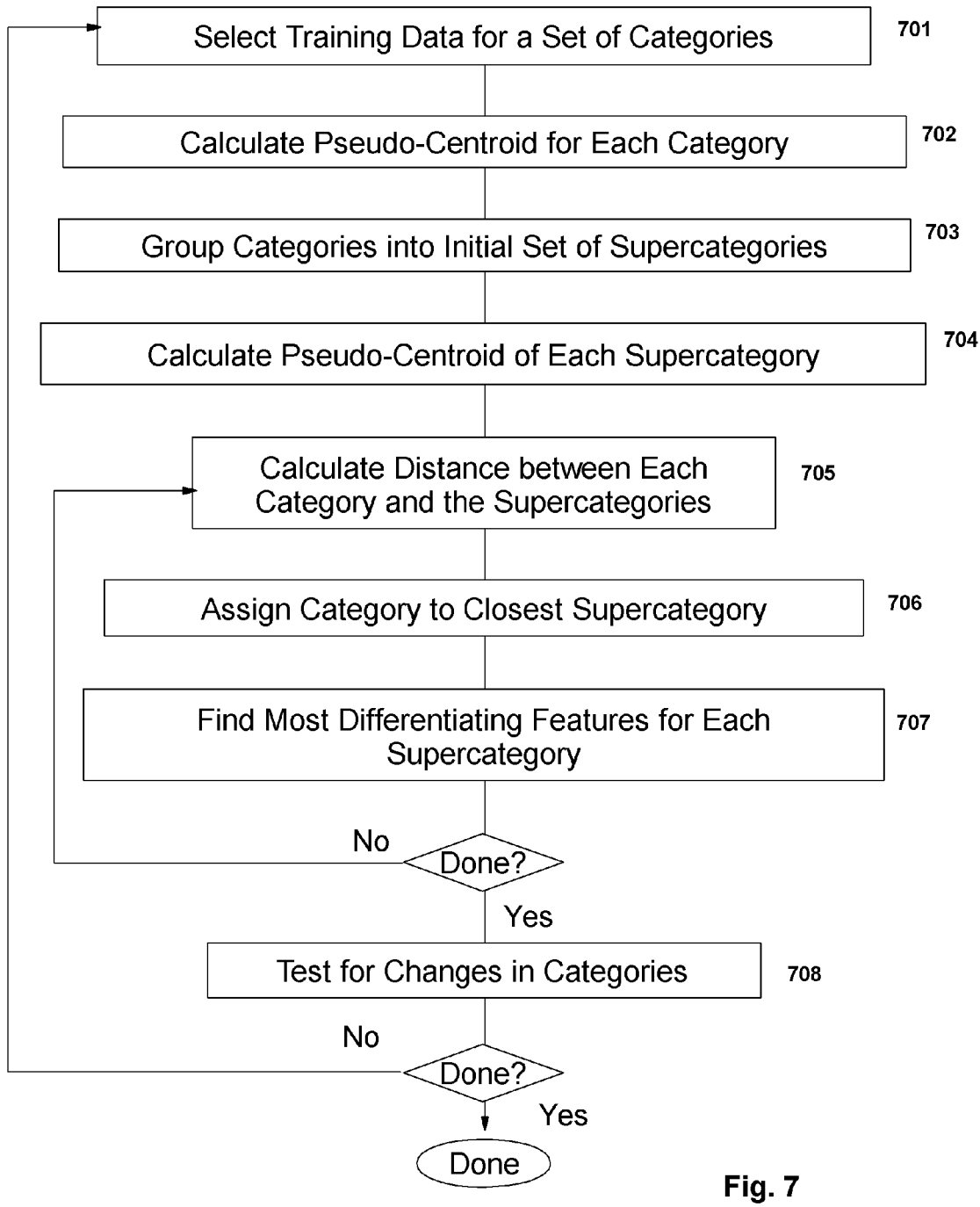
FIG. 7 illustrates an example of a method using a set of more detailed categories as a starting point to form supercategories.

In FIG. 6 and FIG. 7, we show two of the methods we have used to implement step 104, namely the formation of supercategories. In FIG. 6, we show one method we have used, namely to build an initial system including a smaller number of more general categories that are then used to define the supercategories in a second, larger system. In this technique we first, in step 601, implement steps 101-103 and 105-110, with the outcome being a relatively small number of categories (1167 in our specific case). We then in step 602 collect all of the categories that are logically related (e.g., all software-related categories) together into a supercategory (e.g., software); i.e., the supercategory formation criterion in this case is that the categories be logically related. In step 603, we repeat steps 101-103, except with a second, much larger set of categories (45,000 in our case). We calculate the pseudo-centroid of each category in the original set (step 604), and each category in the second (larger) set (step 605) and compare the cosines of each of the first set with each the second set (step 606). We then find the closest category in the first set to each category in the second set (step 607). Each category in the second set is then assigned the supercategory of the best matching item in the first set (step 608). The net effect of this process is to use the supercategories of a small set of data to determine the supercategories of a second set. For example, we had about 80 software-related categories in our first system that we grouped together into the "software" supercategory. We then used these to find about 500 categories in the second system that were software-related. In effect, we used a categorizer based on the first system to bootstrap the building of the second system.

In FIG. 7, we show a second process we have used for building supercategories, in which the supercategory formation criterion is more complex, in that it starts with grouping by logical relationships but then moves categories to supercategories with which they have the most features in common, as measured by cosine distances. This process is very analogous to the steps used in FIG. 1 for selecting training documents, and indeed uses much the same mathematics, except applied to categories rather than documents. In this process, in step 701 we complete steps 101-103 for a large number of categories. We then calculate, step 702, the pseudo-centroid of each resulting set of training data for each category. We then group together apparently related categories into supercategories by finding which are logically related to one another (step 703); i.e., we manually assign categories to an initial supercategory. We then, in step 704, calculate the pseudo-centroid of each supercategory based upon either the sum of the pseudo-centroids of the categories or the pseudo-centroid of the collection of individual documents of the categories. We then calculate the distance (typically cosine), step 705, between each category pseudo-centroid and each of the various supercategory pseudo-centroids. Categories are reassigned to a new supercategory based upon finding, step 706, the closest supercategory pseudo-centroid. Optionally, categories that are too far from any supercategory may be discarded. A set of features which best differentiates the resulting supercategory pseudo-centroids is calculated, step 707, to form a new supercategory pseudo-centroid for each supercategory; this step uses the same mathematical approach as step 106, but with parameters adjusted to ensure that the pseudo-centroids that are formed are more general than those obtained for categories. This is, for example, done by aiming at 800 features rather than 150. Steps 705 through 707 are repeated, using the new supercategory pseudo-centroids this time in step 705 until a stable set of supercategories emerges, generally, this takes 3 to 4 iterations. In step 708, we check to see if there have been significant changes in the categories in a supercategory, such as changes in their definitions or addition or subtraction of categories; if so, we repeat some or all of steps 701-707 to obtain a new set of supercategory pseudo-centroids.

Figure 8:
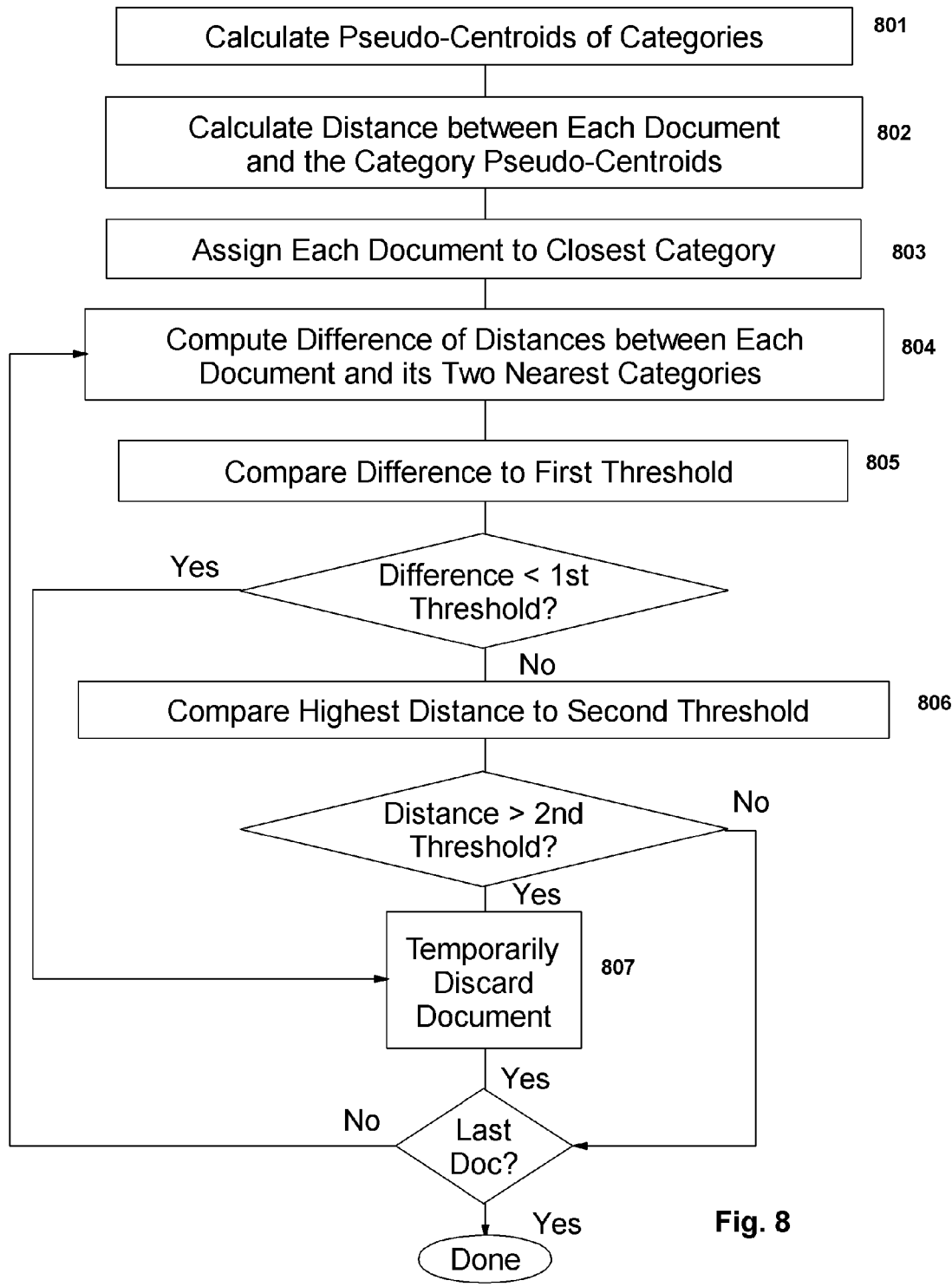
FIG. 8 shows an example of how overlap between categories is reduced.

FIG. 8 shows the details of step 105. The goal of this part of the method is to reduce overlap among categories. This step often starts with a single set of categories that belong to a specific supercategory, i.e., the output of the step 104. In step 801, we calculate the pseudo-centroid of each category in the supercategory, if this has not already been done. In step 802, we calculate (pair-wise) the distance (cosine) between each document and each of the category pseudo-centroids. In step 803, we assign each document to the category to which it is closest (i.e., has the lowest distance or the highest cosine value). In step 804 we calculate the difference between the highest and second-highest cosines to each document (i.e., we compute the difference of the distances between the document and its two nearest categories); in step 805 we compare this difference to a first threshold value. If the difference is below the first threshold, the document is considered to belong to neither category (i.e., occurs in the overlap region between two categories) and is temporarily discarded (step 807); otherwise it is kept. The highest distance (lowest cosine) is also compared in step 806 to a second threshold value; if the cosine is below this threshold (at a higher distance), the document is considered to be too far from any centroid and is temporarily discarded (step 807). Although the thresholds may range from zero to unity, inclusive, we typically use a first threshold of 0.0001 to 0.0025 and a second threshold of 0.25.

Figure 9:
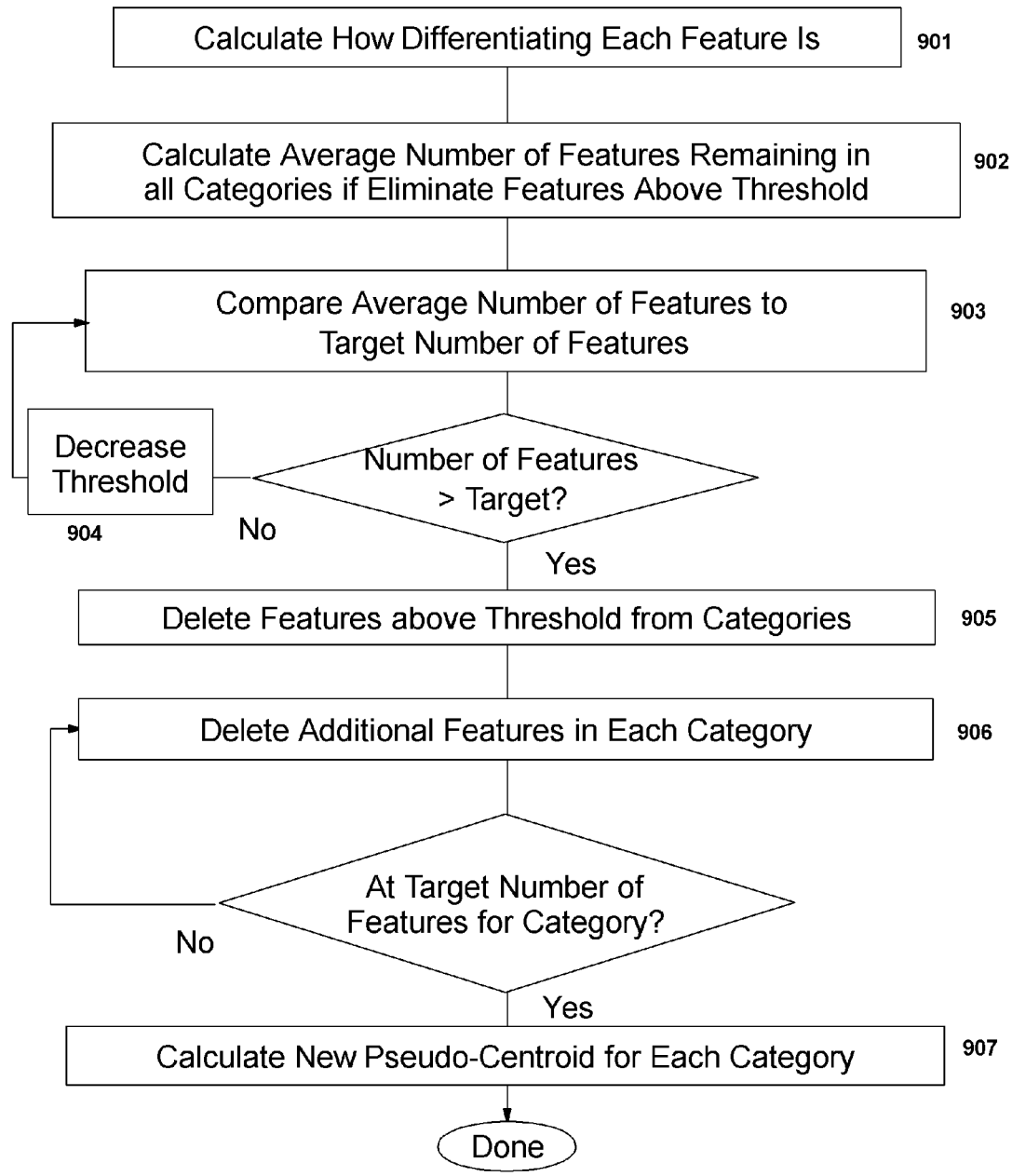
FIG. 9, illustrates an example of the extraction of differentiating features from a set of training data.

FIG. 9 shows the details of step 106 in FIG. 1, namely the extraction of differentiating features using one or more feature extraction criteria. In step 901, we take the output of step 105 and for all documents and categories in the supercategory, calculate a measure of feature differentiation for each feature. In our typical case, the measure of feature differentiation or uniqueness (the feature extraction criterion) is a Gini index, the Gini index having a specifiable upper Gini index threshold, and a specifiable lower Gini index threshold. Gini index thresholds may range from 0 to 1. In step 902, we calculate the average number of features in each category which would remain if we removed all features with a specific upper Gini index threshold, 1.0 in a typical case. In step 903, we compare this average number of remaining features to a target number of features, ranging from 0 to the number of features in the dictionary, typically 165. If the average number of features is above this target, then we set the upper Gini index threshold lower by a user defined amount (step 904), ranging from 0 to 1, typically 0.005, and repeat steps 902-903. Then, in step 905, we delete from all of the pseudo-centroids of all of the categories in the supercategory the features with Gini indexes at or above the threshold. In step 906, we delete features from the category, starting with those at lowest frequency in the category, until the target number of features is reached. Alternatively, we may delete those features that have the lowest Gini index calculated for all documents within a category. At the end, we calculate a new pseudo-centroid from the final set of features, step 907. Other feature deletion criteria may include: selecting at least one feature which is present at high frequency in at least one category or supercategory but not in all categories or supercategories; discarding at least one feature occurring at frequencies below a preselected lower cutoff value within a category or supercategory; discarding at least one feature occurring at frequencies above a predetermined upper cutoff value within a category or supercategory; discarding at least one feature occurring below a preselected lower cutoff frequency or above a predetermined higher cutoff frequency within a particular category or a particular supercategory; discarding at least one feature within said particular category or supercategory having a Gini index above a specified upper Gini index threshold; discarding at least one feature within a particular category or a particular supercategory that has a Gini index within said particular category or said particular supercategory below a certain lower Gini index threshold; selecting at least one feature that most differentiates a single category or a single supercategory from another category or supercategory; deleting at least one feature at a time based on one of these criteria until a desired number of features is obtained; and any combination of these criteria.

In practice, the steps of FIGS. 8 and 9 are performed in an iterative fashion, i.e., we first reduce overlap, then select differentiating features, then reduce overlap, and so forth, through approximately 3 iterations. At each iteration the thresholds are adjusted to be more severe, until an overall target system is reached. Documents that were temporarily discarded during each iteration are usually added back in at the beginning of the next iteration.

Figure 10:
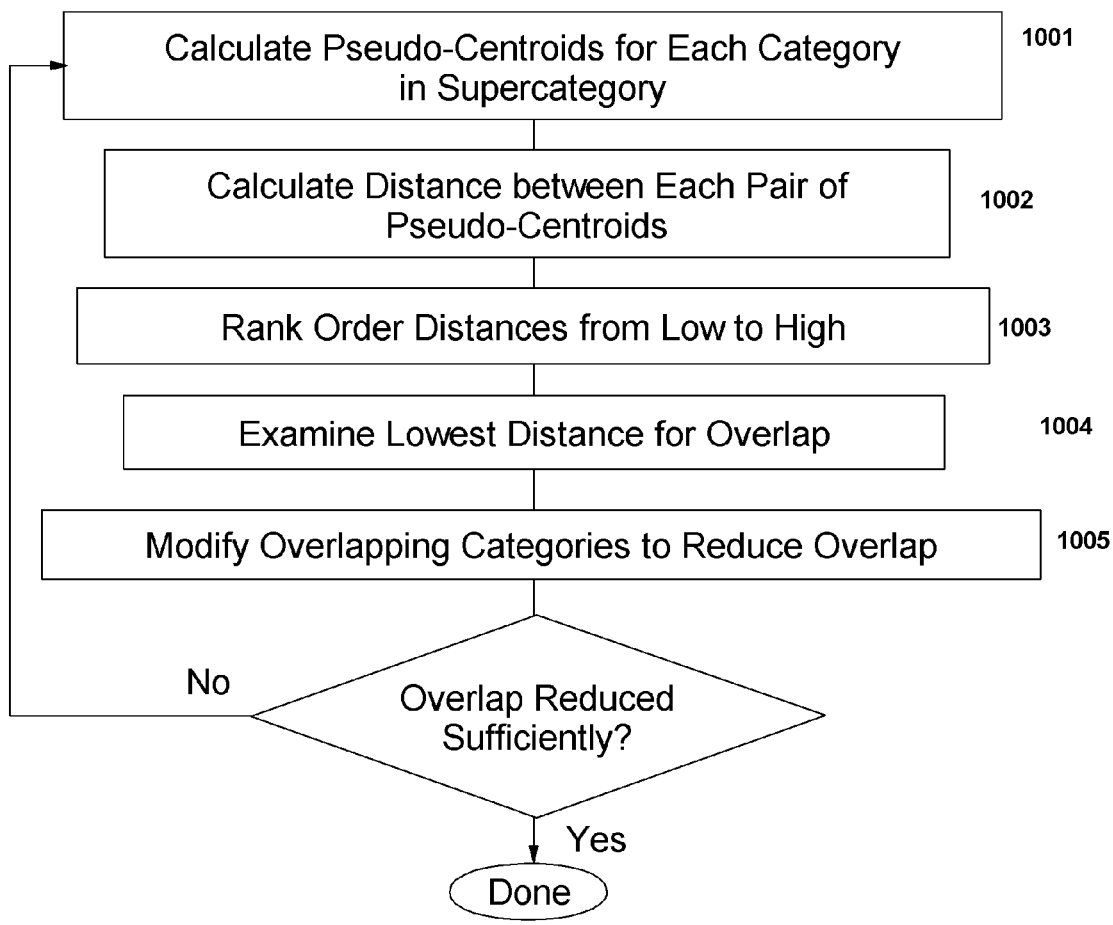
FIG. 10 illustrates an example of a method for testing for category overlap.

We now perform the inspection of the data for further overlap, as shown in FIG. 10, which provides the details of step 107. In step 1001, we calculate the pseudo-centroids for each category in a supercategory, if this has not already been done. We then, in step 1002, calculate the distance between each pair of pseudo-centroids, generally using the cosine measure. In step 1003, we rank-order the list of distances from low to high and then, in step 1004, examine the pairs with the smallest distances manually to determine where the overlap is deemed to be significant. In practice, we find that cosines above 0.60 indicate a degree of overlap that will cause problems, although this threshold varies somewhat by supercategory. We may also perform the steps of FIG. 10 prior to step 105 (i.e., prior to reducing overlap and selecting differentiating features); in this case, the we look for cosines above 0.80 to find the most severe overlap. In any case, categories found to overlap too severely may in some cases be deleted and in other cases have their definitions (queries) modified to reduce overlap (step 1005). This process is continued until the degree of overlap is considered acceptable.

The pseudo-centroids created by steps 101-107 are then generally verified in a variety of ways. This can be by inspection of the pseudo-centroids to ensure that the features in the centroid are reasonable for a particular category. However, a more definitive test is to select a set of documents (test documents), step 108, and to categorize those documents both manually and by using an automatic categorizer, step 109. The automated categorizer uses either the training data or the pseudo-centroids selected by steps 101-107 to define the categories. By comparing the manual and automated results, we identify those areas which need to be improved, and, if necessary, iterate steps 101-109 until the desired degree of precision and recall are achieved.

The present invention can be realized in hardware, software, or a combination of hardware and software. The present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general-purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after conversion to another language, code or notation and/or reproduction in a different material form.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that other modifications to the disclosed embodiments can be effected without departing from the spirit and scope of the invention. The described embodiments ought to be construed to be merely illustrative of some of the more prominent features and applications of the invention. Thus the invention may be implemented by an apparatus including means for performing the steps and/or functions of any of the methods used for carrying out the concepts of the present invention, in ways described herein and/or known by those familiar with the art. Other beneficial results can be realized by applying the disclosed invention in a different manner or modifying the invention in ways known to those familiar with the art.

The invention claimed is:

1. A method comprising generating sets of features representing a plurality of categories from a taxonomy of categories, said generating comprising steps of:
   using an automated categorizer for:

selecting a set of categories which are minimally overlapping with one another and conform to cultural norms about how information should be organized and what is important;

selecting a set of training documents for each particular category from among the selected set of categories, wherein said set of training documents both typify documents for said particular category and are only representative of said particular category;

wherein the step of selecting the set of the training documents comprises implementing a first deletion criterion by winnowing the training documents by eliminating, for each particular category, those training documents that are statistical outliers when compared to other training documents in said particular category;

wherein winnowing comprises:

calculating a measure of central tendency for the training documents in the particular category;

computing a deviation measure for each training document in the particular category from the measure of central tendency, wherein a lower deviation measure indicates a higher similarity; and discarding each training document which has a deviation measure higher than a specified deviation measure from the measure of central tendency, thus producing a reduced set of training documents;

iteratively performing:

calculating a pseudo-centroid as the measure of central tendency for the reduced set by using vectors from all of the training documents in said reduced set;

calculating a cosine between each of the documents in the category and the pseudo-centroid;

determining if the document with a lowest cosine from the pseudo-centroid has a lower cosine than a pre-set threshold, wherein a lower cosine has a higher deviation measure from the pseudo-centroid;

discarding the document with the lowest cosine from the pseudo-centroid when it is determined to have a lower cosine than the pre-set threshold; and stopping the iteration when the document with the lowest cosine from the pseudo-centroid does not have a lower cosine than the pre-set threshold;

implementing a second deletion criterion by selecting documents that are highly similar to one another and located on a same server;

discarding from among those documents on the same server the document with the lowest cosine to the pseudo-centroid;

determining a list of differentiating features for the reduced set of the training documents;

determining from the list of differentiating features the features that occur more frequently than a predetermined upper frequency threshold in a plurality of the categories; and deleting the features that occur more frequently than the upper frequency threshold in the plurality of the categories.

2. A method as recited in claim 1, wherein the step of selecting the categories comprises meeting a criterion selected from a set of taxonomy sensibility criteria comprising:

organizing a taxonomy of categories in a hierarchical fashion, from most general to most specific, with each more specific topic being a subcategory (subdivision) of a preceding more general topic;

labeling the categories in the taxonomy such that the labels describe the topics or concepts accurately and completely;

nearness of two nodes on a taxonomy indicates that the topic categories are generally of the same scope for nodes at the same level;

are conceptually related;

categories are generally of the same scope for nodes at the same level;

having each set of nodes of the taxonomy being sub-nodes of a given node include many of the subtopics of the topic represented by said given node; and any combination of these criteria.

3. A method as recited in claim 1, wherein the step of selecting the categories minimally overlapping with one another includes at least one of:

arranging categories in a directed acyclic graph; arranging categories in a taxonomy; and selecting categories such that categories having a common parent node in the taxonomy have a consistent relationship to said parent node.

4. A method as recited in claim 3, wherein said consistent relationship to said parent node includes:

defining a subdividing characteristic; and representing each aspect of said subdividing characteristic as a child node of said parent node.

5. A method as recited in claim 1, further comprising indicating that said categories are minimally overlapping with one another by picking categories logically mutually exclusive of one another.

6. A method as recited in claim 1, wherein said step of selecting the training documents comprises selecting those training documents producing said set of features being similar to a particular set of features obtained from all possible training documents in said category.

7. A method as recited in claim 6, wherein the step of selecting the training documents comprises:

forming a plurality of queries to a plurality of search engines for providing a set of results;

retrieving a set of URLs from the set of results to said formed queries; and forming a first list of items, each item representing a particular training document referenced by one URL from said set of results.

8. A method as recited in claim 6, wherein producing said set of features includes deleting training documents having more than a specified threshold number come from a same source.

9. A method as recited in claim 1, wherein said step of selecting includes re-adding training documents previously eliminated, but which are similar to a plurality of documents in the reduced set of documents.

10. A method as recited in claim 1, wherein said determining a set of features for each category which best distinguish it from all other categories in the set of categories includes having a minimum number of said set of features in common between any pair of categories.

11. A method as recited in claim 10, wherein said having a minimum number of said set of features in common between any pair of categories includes:

calculating a measure of category feature uniqueness for each feature among a plurality of categories; and eliminating features which have a low degree of category feature uniqueness.

12. A method as recited in claim 11, wherein said measure of category feature uniqueness is a Gini index, and a low degree of category feature uniqueness is a high Gini index.

13. A method as recited in claim 1, further comprising grouping categories into at least one supercategory.

14. A method as recited in claim 13, wherein said plurality of categories for which a set of features is determined is a supercategory.

15. A method as recited in claim 13, wherein grouping categories into a supercategory includes selecting categories which have a plurality of features in common.

16. A method as recited in claim 13, wherein grouping categories into a supercategory includes selecting categories which are logically related to one another.

17. A method as recited in claim 1, further comprising utilizing either said set of features determined for each category, or said set of training documents, or both, as inputs to a categorization system.

18. The method of claim 1 wherein calculating the measure of central tendency comprises computing an average of vectors describing the training documents in the particular category, wherein said vectors are numerical identifiers of a frequency of occurrence of a feature in said particular training document.

19. The method of claim 18 wherein computing an average of the vectors further comprises computing a variant of the vectors.

20. The method of claim 19 wherein computing the variant of the vectors comprises adding square roots of the vectors.

21. The method of claim 19 wherein computing the variant of the vectors comprises adding logarithms of the vectors.

\* \* \* \* \*